US012695669B2

(12) United States Patent
Kumar et al.

(10) Patent No.: US 12,695,669 B2
(45) Date of Patent: Jul. 28, 2026

(54) COMPUTER NETWORK CONTROLLER WITH SWITCH AUTO-CLAIM

(71) Applicant: Cisco Technology, Inc., San Jose, CA (US)

(72) Inventors: Deepak Kumar, San Ramon, CA (US); Shyam Nayan Kapadia, San Jose, CA (US); Neelesh Kumar, Pleasanton, CA (US); Sri Goli, Dublin, CA (US); Eshwar Rao Yedavalli, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 542 days.

(21) Appl. No.: 18/119,172

(22) Filed: Mar. 8, 2023

(65) Prior Publication Data

US 2024/0073099 A1 Feb. 29, 2024

Related U.S. Application Data

(60) Provisional application No. 63/400,134, filed on Aug. 23, 2022.

(51) Int. Cl.
*H04L 41/12* (2022.01)

(52) U.S. Cl.
CPC .................................. *H04L 41/12* (2013.01)

(58) Field of Classification Search
CPC ..... H04L 45/02; H04L 45/64; H04L 41/0806; H04L 41/0846; H04L 41/0856; H04L 41/0873
See application file for complete search history.

(56) References Cited

U.S. PATENT DOCUMENTS

| | | | |
|---|---|---|---|
| 2018/0006833 A1 | 1/2018 | Tatlicioglu | |
| 2019/0104413 A1 | 4/2019 | Cidon | |
| 2020/0052971 A1* | 2/2020 | Nagarajan | H04L 41/122 |
| 2020/0280502 A1* | 9/2020 | Spirt | G06F 11/1446 |
| 2021/0184930 A1* | 6/2021 | Mutnuru | H04L 45/02 |
| 2022/0103514 A1* | 3/2022 | Vaidya | H04L 63/0209 |
| 2022/0294693 A1 | 9/2022 | JeevaRaj | |
| 2022/0321411 A1* | 10/2022 | Cudak | H04L 41/0853 |

\* cited by examiner

*Primary Examiner* — Mahran Y Abu Roumi
(74) *Attorney, Agent, or Firm* — Lee & Hayes, P.C.

(57) ABSTRACT

Techniques for automatically claiming switches of a tenant computer network by a remote, cloud-based network controller. A first seed switch is manually claimed by a user by implementing the remote, cloud-based network controller. After claiming the seed switch a set of switches immediately connected with the seed switch are identified by Device Connector logic in the seed switch and immediately connected switches. Switches directly connected to those switches are then identified using Device Connector logic of the switches. This process is performed iteratively by identifying immediately connected switches until all of the switches are identified. All or a subset of the identified switches can then be claimed by the remote, cloud-based controller based on a response from the tenant network user.

20 Claims, 7 Drawing Sheets

400

RECEIVE IDENTIFYING
INFORMATION REGARDING A SEED
SWITCH
402

RECEIVING IDENTIFYING
INFORMATION REGARDING A
FIRST SET OF SWITCHES
CONNECTED WITH THE SEED
SWITCH
404

RECEIVING IDENTIFYING
INFORMATION REGARDING
ANOTHER SET OF SWITCHES
CONNECTED WITH PREVIOUSLY
IDENTIFIED SET OF SWITCHES
406

All Switches Identified?
408

No

YES

4B

COMPUTER NETWORK CONTROLLER WITH SWITCH AUTO-CLAIM

RELATED APPLICATIONS

This application claims priority to U.S. Provisional Patent Application No. 63/400,124, Filed Aug. 23, 2022, the entire contents of which are incorporated herein by reference.

TECHNICAL FIELD

The present disclosure relates generally to a remote controller for a computer network with the ability to automatically claim switches of a client computer network.

BACKGROUND

Vast amounts of data are transmitted over a wide range of computer network architectures. Example of computer architecture include, but are not limited to Local Area Networks (LAN), Virtual Large Area Network (VLAN), Virtually Extensible Large Area Networks (VXLAN), Wide Area Networks (WAN) such as the internet, etc. Many enterprise data centers employ a LAN, VLAN, or VXLAN network architecture. Management of such a network can be greatly improved and facilitated by use of network controller tools.

Like many other types of computer services, the management of a computer network is moving to a Software as a Service Model (SaaS). In such a model a cloud-based network management service can be provided by a remote, cloud-based computer network controller. However, because such services can be used to manage many different tenant networks, and all of these networks have switches that are connected with the same cloud (e.g. internet), the service cannot tell which switch is connected with which client network until that switch is "claimed" the a user. A user, such as a network manager, of a particular tenant network must claim each switch in the given client network. The claimed switches will then be added to the user's account and recognized as part of the user's tenant network.

A network such a client data center can have hundreds or thousands of switches, all of which must be claimed for the cloud-based controller to be able to manage the network. This can be a very tedious and laborious process for a network user/manager. Therefore, there remains a need for system or process to facilitate the implementation of claiming switches in a cloud-based network management system.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
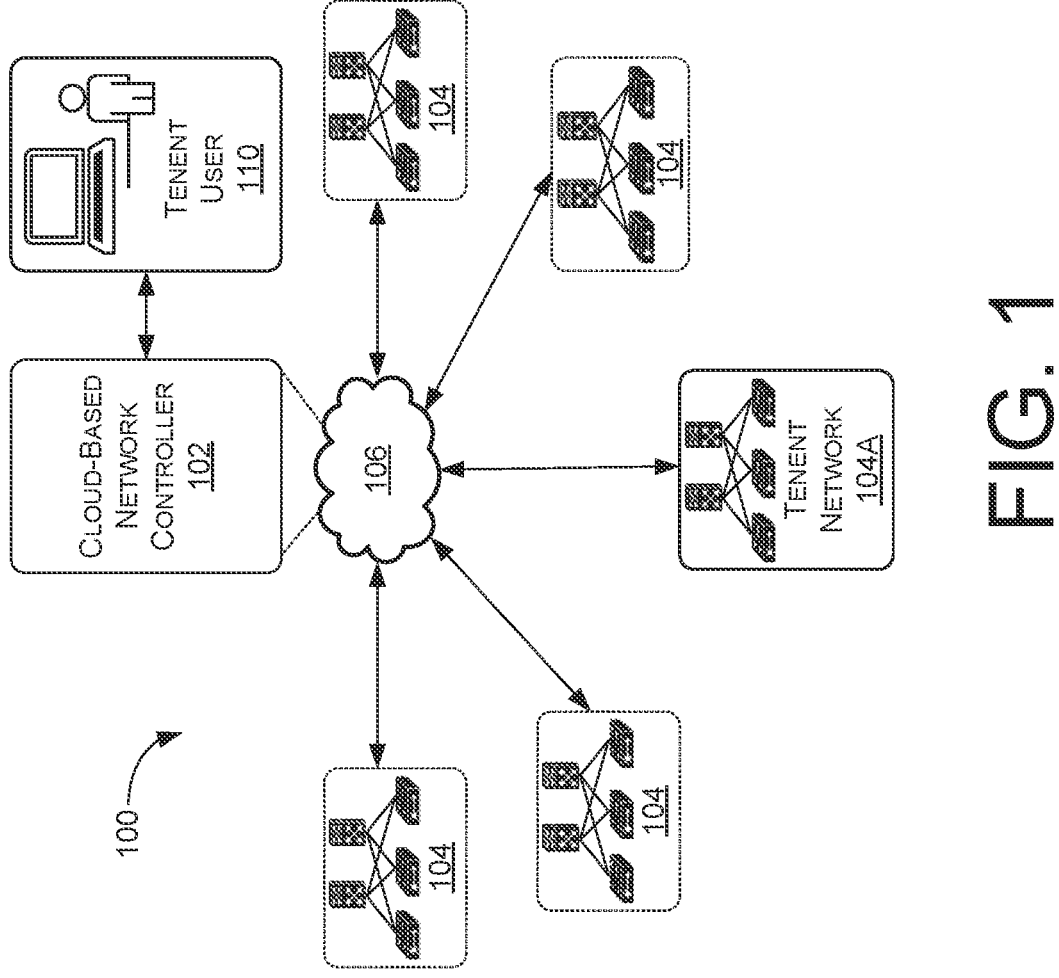
FIG. 1 illustrates a schematic of a remote, cloud-based network management controller for managing several different tenant computer networks.

This disclosure describes techniques for automatically claiming switches of a tenant network by a remote network controller. Information regarding a seed switch is received from a user of the tenant network. Identification information is received from a device connector of the seed switch regarding switches that are directly connected with the seed switch. Identification information is then received from device connectors of those directly connected switches regarding switches that are directly connected to those switches. Using the identification information regarding all of the connected switches, a logical tree is constructed of switches of the tenant network. One or more of the switches of the logical tree can then be claimed by the remote network controller.

Additionally, the techniques described herein may be performed by a system and/or device having non-transitory computer-readable media storing computer-executable instructions that, when executed by one or more processors, performs the method described above.

EXAMPLE EMBODIMENTS

Network management refers to two related concepts. First is the process of configuring, monitoring, and managing the performance of a network. Second is the platform that IT and network operations teams use to complete these ongoing tasks.

Over the last decade, network management systems have evolved to help IT teams operate in more agile ways, incorporating advanced analytics, machine learning, and intelligent automation to continually optimize network performance. As organizations adapt to a more distributed workforce, these network management systems are increasingly deployed in cloud and hosted environments.

Network management systems collect data from connected network devices such as switches, routers, access points, and client devices. They also give network administrators detailed control over how those devices operate and interact with one another. The data captured from these devices is used to proactively identify performance issues, monitor security and segmentation, and accelerate troubleshooting.

Many network management platforms started as a way to control Large Area Networks (LANs). As enterprise networks increased in complexity and diversity, these management planes extended their capabilities to Software Defined Wide Area Networks (SD-WAN), security, and Internet of Things (IoT). The most effective platforms combine devices and sensors into a single view of network traffic, making it easy for IT not only to monitor but to protect and remediate performance issues.

Network management systems collect real-time data from network elements, such as switches, routers, and access points, as well as from endpoint devices, such as mobile phones, laptops, and desktops. This information is used to provide insights into the health of the network. Typically, the data is collected and sent to the system in one of two ways. The Simple Network Management Protocol (SNMP) is an open standard and has been widely supported by most manufacturers of network elements since the early 1990s. SNMP queries each element in the network and sends each response to the network management system. Another way in which data is collected is by streaming telemetry. A software agent installed in a network element allows for the automatic transmission of key performance indicators in real time. Streaming telemetry is rapidly replacing SNMP, because it is more efficient, can produce many more data points, and is more scalable. Also, telemetry standards, such as NETCONF/YANG, are gaining traction as ways to offer the same multivendor support as SNMP.

When it comes to managing a complex or highly distributed network, the three most critical capabilities of a network management tool are directly tied to how well that platform unifies sites and remote workers. First, ease of adoption and deployment directly affect the value that IT teams will get from the tool. If it is not easy to deploy and use on a daily basis, it will quickly fall by the wayside. It is also important to find a platform that can manage the full scope of the network, from access to WAN to IoT. And, finally, the security, control, and treatment of network data must have equal priority, no matter how you choose to deploy.

Networks become more complicated as the number of devices and applications connected to them grows, but a complicated network does not require a network management system that is complicated to use. Current network management systems are open, extensible, and software-driven to help accelerate and simplify network operations while lowering costs and reducing risk. Powered by deep intelligence and integrated security, these systems deliver automation and assurance across the entire network, whether large or small, resulting in better efficiency and cost savings, while offering end-to-end visibility, automation, and insight. Open APIs and standards such as OpenConfig mean users can optimize their networks with solutions that best fit their business objectives.

In today's hybrid work environment, organizations face a variety of new challenges. The challenges include a highly distributed and mobile workforce, an inconsistent range of quality connectivity options, and the need to rapidly implement tools for collaboration, support, and business continuity. In turn, network management systems need to be agile, with built-in intelligence and automation to facilitate decision making and reduce errors. Security must be inherent and prioritized to help ensure that networks and devices connected to them are secure from the core to the edge.

Application Centric Infrastructure (ACI) customers who own a private cloud sometimes may run part of their workload on a public cloud. However, migrating the workload to the public cloud requires working with a different interface and learning different ways to set up connectivity and define security policies. Meeting these challenges can result in increased operational cost and loss of consistency. ACI can use cloud-based network controllers to extend a multi-site fabric network service.

Cloud-based network management can provide agility, flexibility and scalability. Whether a user needs to prepare its central campus for its new role as a hub of hybrid work or scaling out hundreds or thousands of branch sites, cloud-based network management systems are designed to provide the needed reach and flexibility. These platforms offer easy access and monitoring across highly distributed networks and make provisioning of remote sites simple.

Cloud-based platforms also provide a high level of configurability and customization, through open APIs and robust application ecosystems. These platforms also support advanced analytics, automation, and optimization use cases, through large data lakes and the power of cloud of computing to support sophisticated machine learning applications.

On-premises network management systems can be used for large campus networks that require greater performance while still requiring scalability. They also provide advanced features such as analytics, assurance and artificial intelligence and machine learning. Organizations that need sovereign operations can benefit from on-premises network management servers, since all of the data is stored on site. In many cases, network management system for larger networks can generate a lot of data that is collected from telemetry and SNMP. On-premises systems are usually run on larger servers that have enough power to process the data so that it can be used to provide the insights that IT teams need to mange the network. This is one reason an on-premises server is usually located in the core of the network. Although, it can be accessed from the internet, remote access requires a VPN connection.

Modern networks are growing exponentially and becoming much more functionally complex. As a result, many network management systems are enhanced with advanced capabilities, such as automation, assurance, and monitoring, that leverage technologies such as artificial intelligence and machine learning. These advanced features simplify the day-to-day running of the network while helping IT teams to respond to changes and challenges faster and more intelligently.

Network automation is the process where repetitive tasks such as configuration and software upgrades can be done automatically. Network management systems push out new software updates and updated configuration files, saving IT time and improving performance. Network assurance leverages artificial intelligence and machine learning to provide IT teams with better insights into the health of the network, clients, and applications. IT can use this to identify and correct issues such as poor client experience or wireless coverage gaps. These advanced features can also provide cost-effective consumption. Many vendors of network management systems offer software subscriptions. Users can subscribe to various tiers of software that deliver value where and when they need it.

Cloud Network Controllers can include a software component of Application Specific Integrated Circuitry (ASIC) that can be deployed on a cloud-based virtual machine (VM). A cloud network controller can provide the following features. It provides an interface that is similar to an existing APIC to interact a cloud-based network. It can automate the deployment and configuration of cloud connectivity. It can configure the cloud router control plane. It can translate proprietary policies to cloud native policies and can discover endpoints.

Cisco's Nexus Cloud® powered by the Intersight® platform is a new solution that can offer a Software as a Service (SaaS) based solution for monitoring and management of all on-premises data center deployments. Onboarding a device such as a switch or network appliance can be facilitated by software called a Device Connector implemented on each of the devices that called a Device Connector. The device can be claimed, thereby allowing adoption telemetry to be collected for the device that runs the device connector software. All that the device connector needs is https reachability. The DC can be run on the APIC cluster.

Once the controller is claimed, the switches managed by the controller can be auto-claimed via a parent-child hierarchical relationship. After claiming the switches, on top of adoption telemetry, various kinds of services can be provided from the cloud. The cloud-based service can provide advanced monitoring, insights, and analytics services, and can provide provisioning services.

For standalone based deployments (controller-less), the device connector runs on the switches themselves. To claim the switch, a user must manually input the device connector UUID and claim code (security token) from every switch in the network and claim them one by one. This is rather cumbersome process since customer deployments can have hundreds or thousands of switches.

Embodiments disclosed herein provide an elegant solution that an provide easy onboarding and claiming of switches in such a controller-less cloud-based deployments that can not only help in the initial bootstrap phase, but also can provide an easy way to onboard additional devices incrementally.

For switches in the network to have easy auto-claim functionality as described herein the switch should have the following configuration. The switch should feature Link Layer Discovery Protocol (LLDP) or feature Cisco Discovery Protocol (CDP)®. The line Virtual Teletype (VTY) access list should allow Secure Shell (SSH) prototype from seed switches. In addition, all switches should have the same username and password for claiming.

A seed switch is the first switch that is onboarded onto the cloud-based network controller in a given site of a given tenant network. There can be more than one seed switch in a given site or network. Once the switches have been configured to have IP connectivity to the cloud-based controller, switches will get a device connector Universal Unique Identifier (UUID) and claim code (security token. The claim code can have a lifetime of a few minutes. Since either CDP or LLDP is required for discovering the topology, appropriate TLV extensions can be added to ensure that each switch knows not only its neighbor switches, but also the DC-UUID associated with its neighbors. Once connectivity is established, each switch reports information about itself and its neighbors along with their respective DC-UUIDs. This inventory and connectivity information can be stored in an appropriate database in the list of unclaimed devices. The unclaimed devices repository can have switch information for all of the switches of all of the tenants that are trying to connect with the remote controller.

By way of example, assuming a certain tenant has a network topology that include five switches. This tenant, once registered with the cloud-based network controller can log into their account via a portal and user interface. From their existing network, they can manually claim one switch as a seed switch. The seed switch can be claimed by getting information (DC-UUID, claim-code) about the seed switch. This information is entered into the cloud-based network controller portal so that the seed switch is claimed. Subsequently, based on the seed switch, a connectivity tree is created in the cloud with certain depth, with that seed switch as the root. The tree is built with the neighborship information that is already part of the unclaimed switch repository.

The cloud-based service is responsible for this functionality. Using this connectivity tree, the user can now be presented with a list of candidate switches that can now be onboarded onto the cloud-based network management service. Once the user has selected all or a subset of switches to claim, they are prompted to enter the username and password that will be used by the seed switch to reach the other switches. When the user chooses to continue, the following three operation can happen in the background: the cloud service communicates the entered username, password, and claim list to the seed switch; the seed switch contacts each switch in the list and obtains a device-id and claim-code on demand and returns it to the cloud service; and the cloud service then uses the list of device-id, claim-code to automatically claim the list of user selected switches on the cloud-based management service.

This completes the initial onboarding of the switches for a given tenant. For incremental switch addition, there can be a background thread that periodically checks for changes in the connectivity tree from the seed switch. If new switches are discovered in the tree, then users can be prompted for an appropriate notification so that they can look at the new candidates and decide whether they want to import or claim those into the cloud-based service as well. When the user selects these, and the same three operations discussed above are again performed.

The mechanism described above can work for any switch that runs the Device Connector (DC) and that implement the LLDP TLV extensions. For scenarios where it may not be feasible to run the DC on the switch, there can be an option to run a light-weight proxy VM on-premises which will run the DC and connect with the cloud-based service on behalf of the switches. There can be a light-weight discovery model running on this VM, that can discover the topology via LLDP and then serve as a proxy for all of the switches on the on-premises side. The user just needs to onboard the DC on the VM, which essentially will allow the cloud-based service to get all of the information about the underlying switches via the VM DC.

FIG. 1 is a schematic illustration of a network architecture 100, that includes a remote, cloud-based network controller 102 for controlling and managing various customer computer networks 104, including a particular tenant network 104a for which one or more network switches can be claimed.

Each of the networks 104, 104A are connected with a cloud-based computer network 106, which can be a Wide Area Network (WAN), such as the Internet. The remote, cloud-based controller 102 can reside in one or more servers (not shown) of the cloud-based computer network 106.

Each of the networks 104, 104A has a plurality of network switches 108 that connect with remote controller 102 by connecting with the cloud WAN 106. Because the controller can manage various customer networks 104, the controller cannot tell which tenant network each switch belongs to unless each switch 108 is claimed for that network 104. In the embodiment shown in FIG. 1, a tenant user 110 can control and manage that user's tenant network 104a by accessing and using the remote, cloud-based network controller 102. As will be shown and described in greater detail herein below, the tenant user 110 can access the remote, cloud-based controller to automatically claim one, or more, or all of the switches 108 in the user's tenant network 108, thereby allowing that network to be managed and optimized by the remote, cloud-based controller 102.

Figure 2:
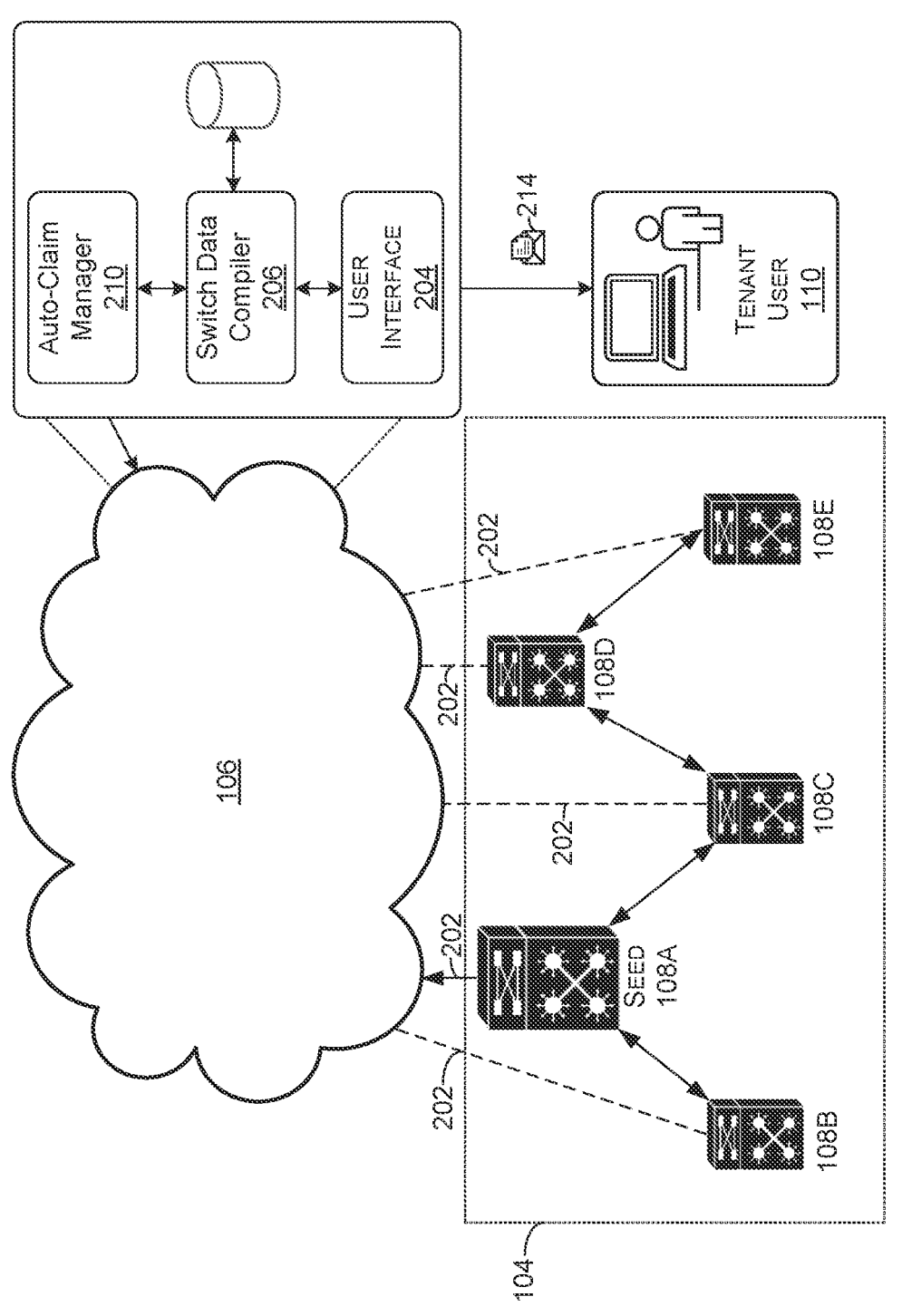
FIG. 2 illustrates a schematic showing an enlarged, detailed view of the remote, cloud-based network controller for managing a tenant computer network.

FIG. 2 is a schematic showing a particular tenant network 104a and remote, cloud-based network controller 102 in greater detail, in order to show how switches 108 of the tenant network can automatically claimed by the controller 102. Each of the switches 108 is connected to the cloud/WAN 106 as indicated by dashed lines 202. The remote, cloud-based controller 102 can include various modules 204-206, which can perform various operations implemented in software such as through use of a Central Processing Unit (CPU) or implemented in hardware such as by Application Specific Integrated Circuitry (ASIC).

A tenant user 110 can initiate an automatic switch claiming process (auto-claim). To initiate the auto-claim, the user must first select at least one switch (e.g. 108A) as a seed switch to manually claim. The user can initiate this process by interacting with a User Interface Module 204. The User Interface Module 204 can interact with a Switch Data Interface 206, which receives information regarding the connectivity and identity of switches 108 of the tenant network Once the seed switch 108A is manually claimed, identification information regarding other switches in the network can be compiled to form a logical switch tree. Each of the switches 108 of the tenant network 104 has includes a Device Connector (not shown in FIG. 2) which provides information regarding other switches to which it is directly connected. This information regarding the identity of switches to which it is directly connected. For example, as shown in FIG. 2, the previously claimed seed switch 108A is directly connected with switches 108B and 108C. The Device Connector module of the seed switch 108A sends information regarding the identities of switches 108B and 108C to the cloud 106 where it is received and processed by the Switch Data Compiler 206.

Once the directly connected switches 108B, 108C are identified, Device Connector software and/or hardware in those switches identifies switches to which they are directly connected. For example, switch 108B is only connected with the seed switch 108A. Switch 108C is directly connected with seed switch 108A and with switch 108D. This information is then sent to the Switch Data Compiler module 206 of the remote controller 102. This process is continued iteratively until all of the switches 108 of the tenant network 104 have been identified. For example, after switch 108 has been identified, a device connector of that switch identifies that it is directly connected with switch 108E, and this information is sent through the cloud 106 to be received by the Switch Data Compiler 206.

The Switch Data Compiler processes the received switch identity information to form a logical tree of switches 108 of the tenant network 104. This information regarding the identity of switches 108 in the network 104 and the logical tree generate by the Switch Data Compiler can then be sent to a database 208 where it can be stored for later retrieval and use as will be described below.

The switch identification information and the logical switch tree are sent to the user interface 204, which can push a notification 214 to the Tenant User 110. The notification can include a listing of the identified switches and can include the logical switch tree. The notification can also include a query to Tenant User as to which switches 108 the user 110 would like to claim. The notification 214 and query can also include an option to simply claim all of the identifies switches.

The Remote Network Controller can utilize the Auto-Claim Manager 210 to perform the actual claiming process. The Auto-Claim Manager 210 can include logic and/or circuitry for automatically claiming the switchers selected by the Tenant User 110. The Auto-Claim Manager 210 can implement software such as through use of a CPU and/or can include hardware such as Application Specific Integrated Circuit (ASIC) for implementing the switch claiming process.

In addition to initial onboarding, the auto-claim process can be performed periodically to identify switches added to the network that can be claimed. For example, in one embodiment, the logical switch tree can be updated at regular intervals to identify new switches. A notification can then be sent to the Tenant User to ask whether the Tenant User 110 would like to claim the newly added switches.

In one embodiment, in order to implement the auto-claim, the tenant user 110 can be required to provide a unique username and password. The username and password can be the same for all of the switches 108 in the network 104. In one embodiment, the username and password are not stored by the remote network controller 102 in order to ensure added security.

Figure 3:
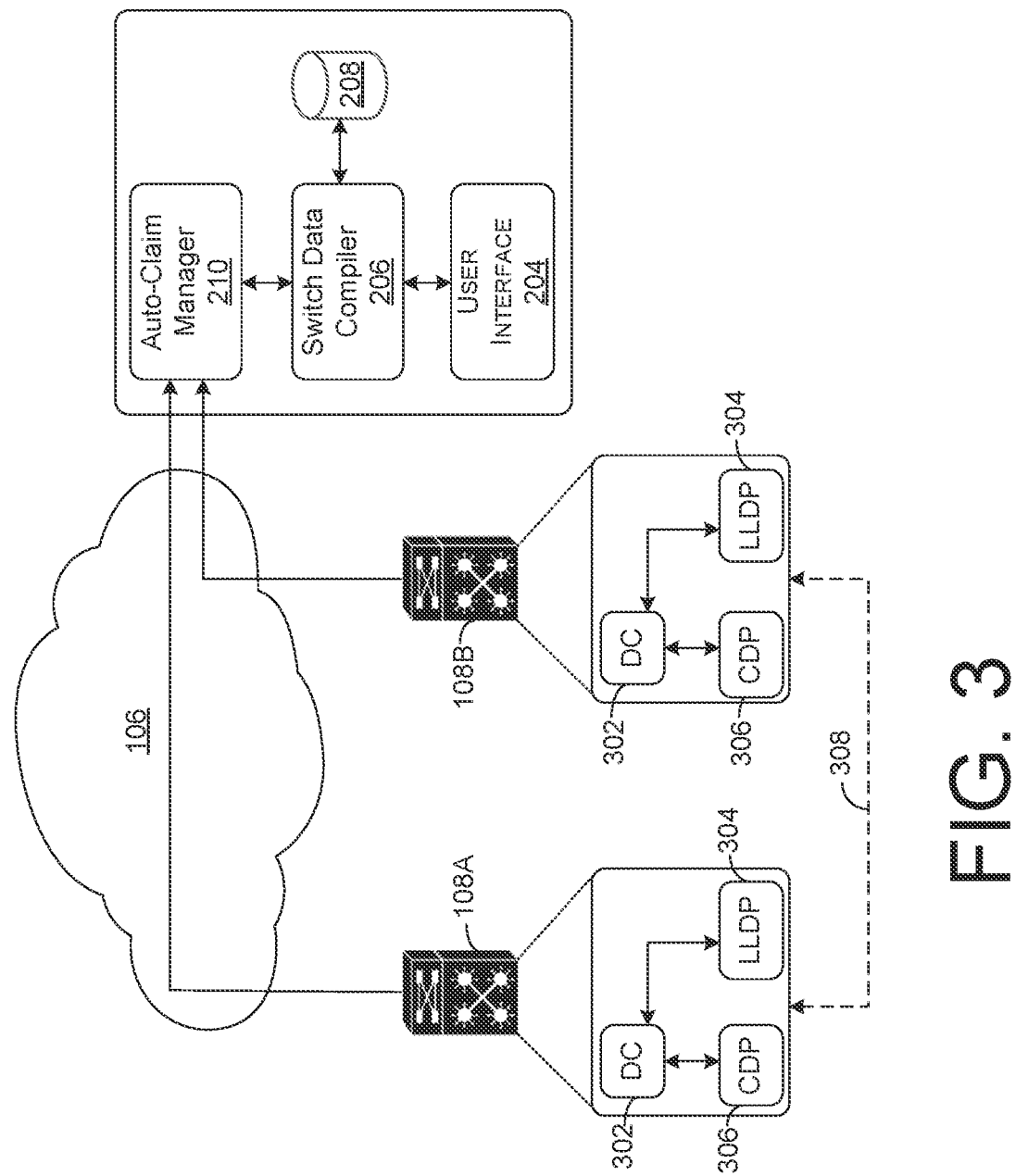
FIG. 3 illustrates a switches a client network having Device Controller logic for providing identifying information regarding switches to which it is directly connected.

FIG. 3 illustrates a schematic switches 108a, 108b of a network 104 in greater detail and showing included logic for implementing auto-claiming by the Remote Network Controller 102. As seen in FIG. 3, each of the switches can include the previously discussed Device Connector logic 302. The switches 108 can also include a Link Layer Discovery Protocol (LLDP). In some embodiment, the switches 108 may include Cisco Discovery Protocol (CDP)® logic, which may be in addition to or in lieu of the LLDP. DCP is a network discovery tool, which assists network administrators and engineers in identifying neighboring network switching devices, especially those running lower-layer transport protocols. LLDP is a layer 20 neighbor discovery protocol that allows switching devices to advertise device information to their directly connected peer or neighbor switching devices. LLDP can be used globally to standardize network topology across all devices in a multi-vender network.

In one embodiment, the Device Connector can access one or both of the DCP and/or LLDP to determine directly connected devices, such as switches 108a and 108b which are directly connected by line 302. As described above, the information regarding connected switches is sent via the cloud 106 (e.g. WAN) to the Auto-Claim Manager 210 of the remote, cloud-based network controller.

A Cisco Discovery Protocol (CDP)® is a Cisco proprietary software tool for identifying network switches that are directly connected with on switches running CDP. CDP is a protocol that runs on network devices and that helps discover other devices on the network. CDP runs on the data-link layer and is enabled by default. A user can use a "show cdp neighbors" command to see all directly connected neighbors.

Link Layer Discovery Protocol (LLDP) is a layer two discovery protocol, similar to CDP. One difference between LLDP and CDP is that LLDP is a standard, while CDP is a Cisco® proprietary protocol. Some switches support the IEEE 802.1ab version of LLDP. This allows devices to advertise information about themselves to other network devices. LLDP uses attributes that contain type, length and value descriptions. These are called TLVs (Type, Length, Value). Devices that support LLDP use TLVs to send and receive information to their directly connected neighbors. Examples of TLVs include: Port description TLV; system name TLV; system description TLV; system capabilities TLV; and management address TLV.

Some network end devices (like IP phones) can use LLDP for Virtual Large Area Network (VLAN) assignment of Power over Ethernet (PoE) requirements. To accomplish this, an enhancement was mad which is called Media Endpoint Discovery (MED). This is typically known as LLDP-MED. Configuration of LLDP is relatively simple, depending upon the type of switch and IOS version, LLDP might be either enabled or disabled by default.

As discussed above, the Device Connector (DC) is software that can be included in a network switch to identify other devices (e.g. switches) to which the switch is directly connected. The DC 302 can utilize either of CDP 306 or LLDP to perform the identification as indicated by dashed line 308.

Figure 4A:
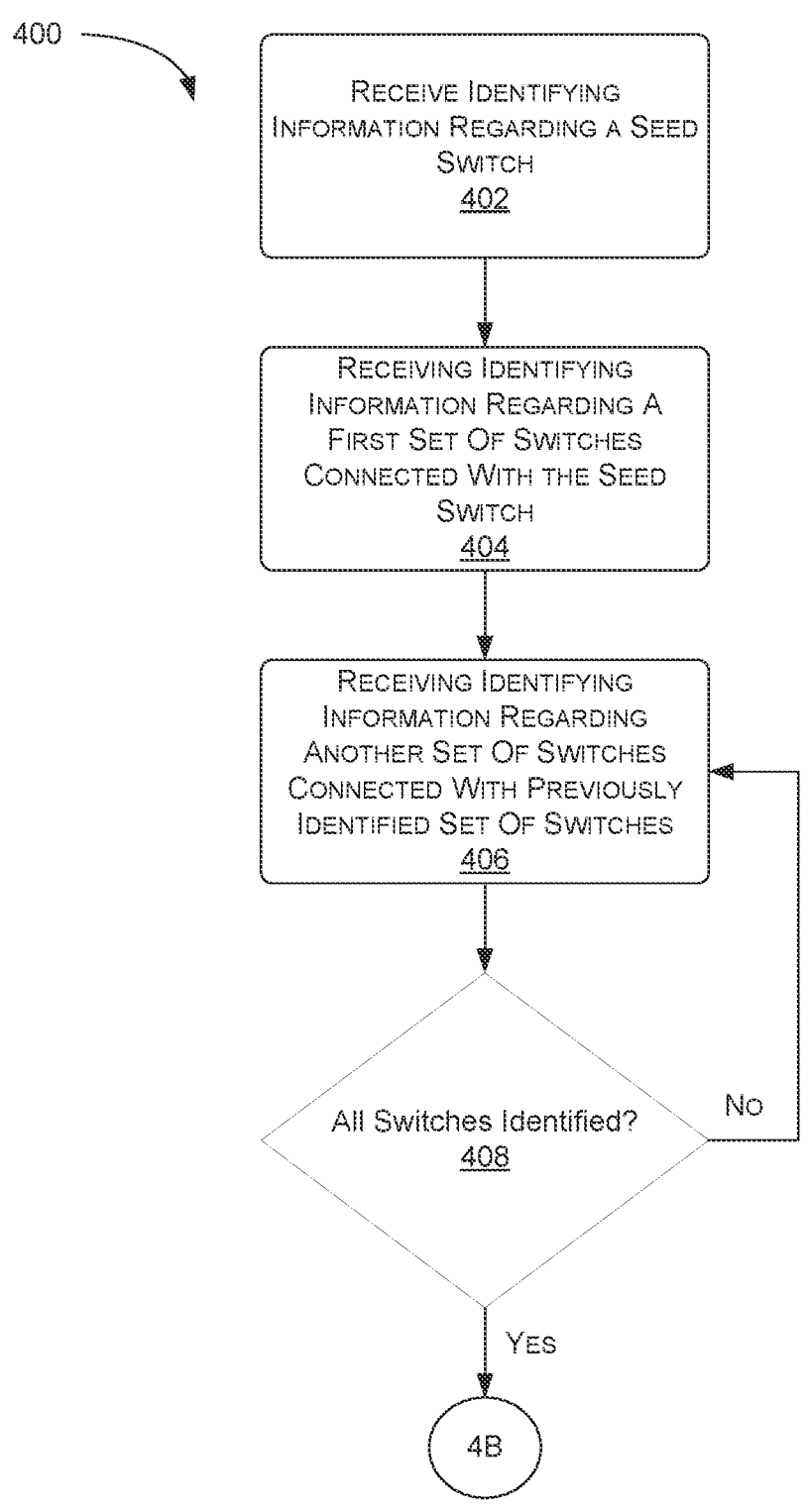
FIGS. 4A-4B illustrate flow charts of a method according to an embodiment.
Figure 4B:
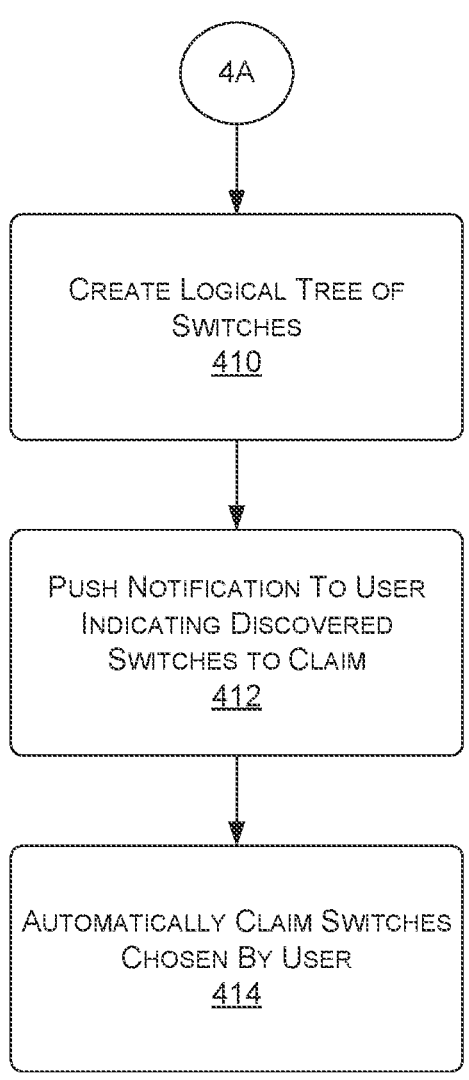

FIGS. 4A and 4B illustrate flow diagrams of an example method 400 that illustrate aspects of the functions performed at least partly by the devices as described in FIGS. 1-3. The logical operations described herein with respect to FIGS. 4A and 4B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4A and 4B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIGS. 4A and 4B are flow diagrams illustrating a method 400 for automatically claiming switches of a tenant computer network. The method 400 can be implemented by a remote, cloud-based computer network controller, which can in implemented in one or more servers of a cloud-based network such as a Wide Area Network (WAN) or the Internet. Information is received regarding a seed switch 402. The seed switch information can be received by a tenant user through a user interface. The seed switch can be a switch of the tenant network and it can be claimed manually by a logic of the remote, cloud-based controller.

Information is received regarding one or more switches of the tenant network that are directly connected with the seed switch 404. The information can be generated by device connector logic of the seed switch, which recognizes directly connected neighbor switches. In one embodiment, each of the switches of the tenant network includes a device controller. In another embodiment, each of the switches of the tenant network can include one or more of a Link Layer Discover Protocol logic and/or Cisco Discovery Protocol (CDP)® logic.

Identifying information is received regarding one or more switches that are directly connected with the previously identified switches 406. Again, this identifying information can be generated by Device Connector logic of the switches and may also be implemented using one or more of CDP or LLDP logic. A determination is made as to whether identifying information has been received for all of the switches of the tenant network. In response to determining that not all of the switches of the tenant network have been identified, then the previous step is repeated to receive identifying information for previously identified switches. In response to determining that all of the switches of the tenant network have been identified, then a logical tree of switches of the tenant network is generated 410.

A notification can be sent to a tenant network user (e.g. manager) to let the user know which switches are available to be automatically claimed. The user can provide an indication to claim all or a subset of the available switches 414. Upon receiving this response from the tenant user, the selected set of switches can be automatically claimed 414 by the remote, cloud-based network controller.

Figure 5:
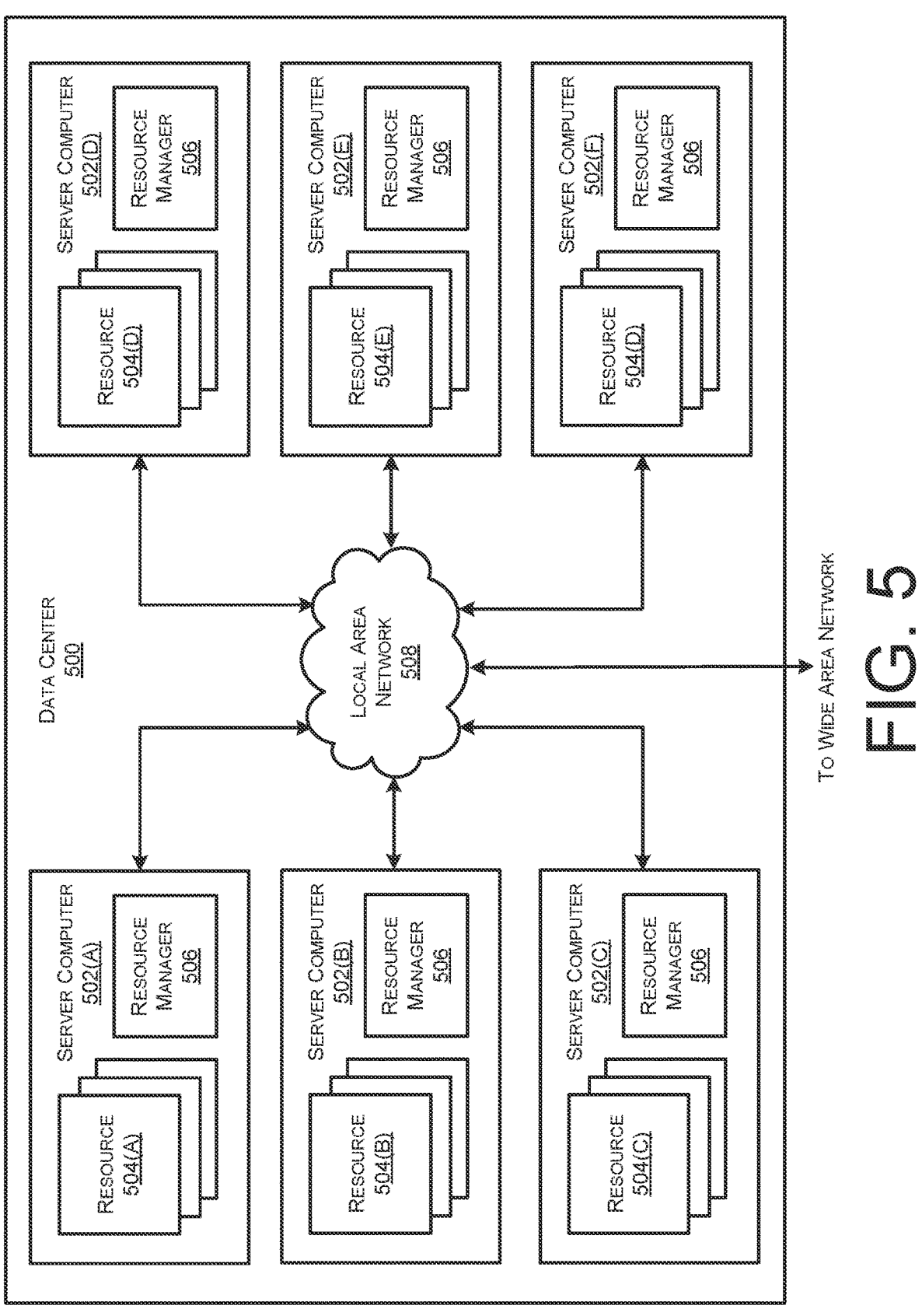
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several server computers 502A-502F (which might be referred to herein singularly as "a server computer 502" or in the plural as "the server computers 502") for providing computing resources. In some examples, the resources and/or server computers 502 may include, or correspond to, the any type of networked device described herein. Although described as servers, the server computers 502 may comprise any type of networked device, such as servers, switches, routers, hubs, bridges, gateways, modems, repeaters, access points, etc.

The server computers 502 can be standard tower, rack-mount, or blade server computers configured appropriately for providing computing resources. In some examples, the server computers 502 may provide computing resources 504 including data processing resources such as VM instances or hardware computing systems, database clusters, computing clusters, storage clusters, data storage resources, database resources, networking resources, and others. Some of the servers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single server computer 502. Server computers 502 in the data center 500 can also be configured to provide network services and other types of services.

In the example data center 500 shown in FIG. 5, an appropriate LAN 508 is also utilized to interconnect the server computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502F in each data center 500, and, potentially, between computing resources in each of the server computers 502. It should be appreciated that the configuration of the data center 500 described with reference to FIG. 5 is merely illustrative and that other implementations can be utilized.

In some examples, the server computers 502 may each execute one or more application containers and/or virtual machines to perform techniques described herein. In some instances, the data center 500 may provide computing resources, like application containers, VM instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 5.

Figure 6:
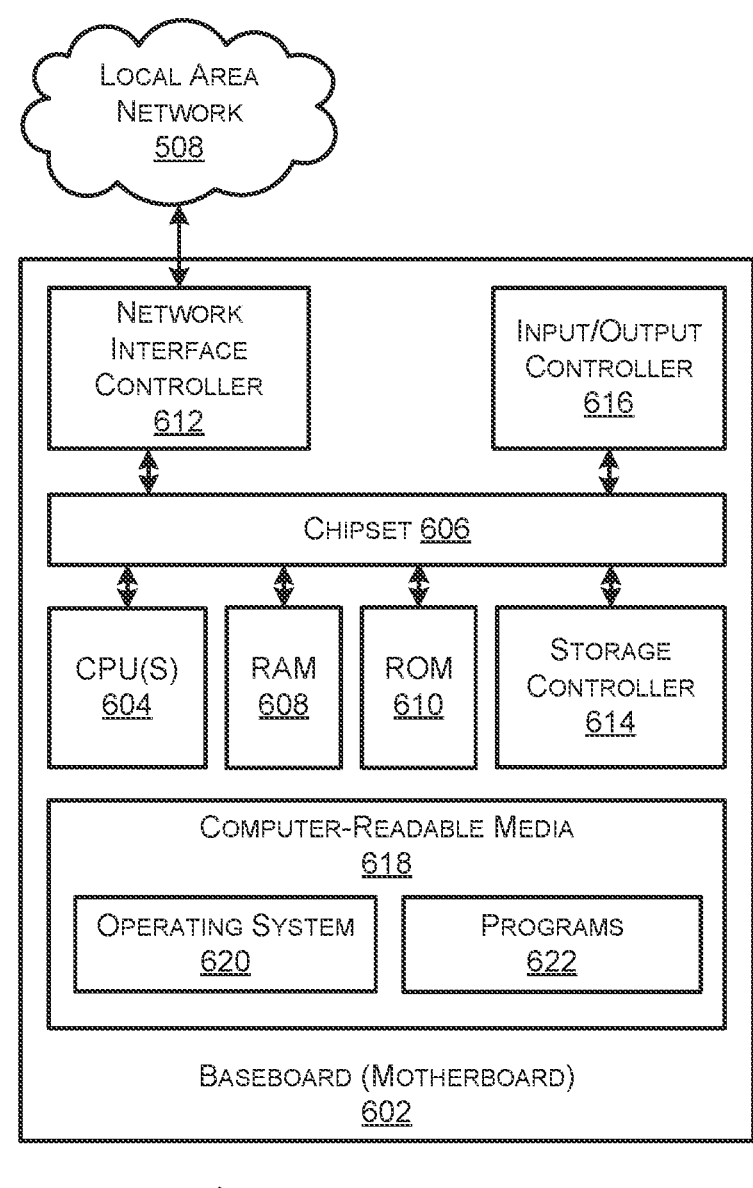
FIG. 6 is a computer architecture diagram showing an illustrative computer hardware architecture for implementing a computing device that can be utilized to implement aspects of the various technologies presented herein.

FIG. 6 shows an example computer architecture 600 for a computer such as the server computer 502 capable of executing program components for implementing the functionality described above. The computer architecture 600 shown in FIG. 6 illustrates a conventional server computer, workstation, desktop computer, laptop, tablet, network appliance, e-reader, smartphone, or other computing device, and can be utilized to execute any of the software components presented herein. The computer 600 may, in some examples, correspond to one or more servers providing the remote network controller 102 of FIGS. 1-3, or network switches 108 of FIGS. 1-3 described herein above, and may comprise networked devices such as servers, switches, routers, hubs, bridges, gateways, modems, repeaters, access points, etc. such as network switches.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates.

These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network 624, such as the network 508 of FIG. 5 or network 108 of FIGS. 1-3. The chipset 606 can include functionality for providing network connectivity through a Network Interface Controller (NIC) 612, such as a gigabit Ethernet adapter. The NIC 612 is capable of connecting the computer 600 to other computing devices over the network 608. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 800 through a storage controller 814 connected to the chipset 606. The storage device 618 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 502. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-4B. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the switches 108, or the network controller 102. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure. The programs 622 may comprise any type of program that cause the computer 600 to perform techniques for communicating with other devices using any type of protocol or standard usable for determining connectivity.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for automatically claiming switches of a tenant computer network, the method comprising:

receiving, at a controller and from a user, information regarding a seed switch of the tenant computer network, wherein the controller manages a plurality of tenant computer networks;

claiming the seed switch by registering the switch with an account associated with the user based on the information regarding the seed switch received from the user;

receiving, at the controller and from a device connector of the seed switch, first identification information regarding a first set of switches, the first set of switches being-directly connected with the seed switch;

receiving, at the controller and from a device connector of each of the first set of switches, second identification information regarding a second set of switches each of which is directly connected with at least one switch of the first set of switches, wherein the first set of switches and the second set of switches are unregistered to any accounts managed by the controller such that the controller is unaware to which of the plurality of tenant computer networks the first set of switches and the second set of switches belong;

using the first identification information and the second identification information, constructing a logical tree of switches of the tenant computer network;

receiving input from the user indicating a particular set of switches in the logical tree that are to be claimed; and using the first identification information and the second identification information, claiming the particular set of switches of the logical tree of switches such that the particular set of switches are registered with the account independent of the user providing the first identification information and the second identification information.

2. The method as in claim 1, further comprising sending a notification regarding switches to be claimed from the logical tree of switches.

3. The method as in claim 1, further comprising repeatedly receiving identification information regarding directly connected switches until all switches of the tenant computer network have been identified.

4. The method of claim 1, wherein each of the switches of the logical tree of switches comprises link layer discovery protocol logic.

5. The method as in claim 1, wherein each of the switches comprises Cisco Discovery Protocol logic.

6. The method of claim 1, further comprising:

maintaining, at the controller, an unclaimed device repository comprising identification information for switches from a plurality of different tenant computer networks, wherein the unclaimed device repository stores the first identification information and the second identification information prior to the claiming of the particular set of switches, and wherein the identification information for switches of different tenant computer networks is stored together in the unclaimed device repository without the controller being able to associate any particular switch with any particular tenant computer network until that switch is claimed by a user associated with that tenant computer network.

7. The method of claim 1, further comprising:

after claiming the particular set of switches, periodically updating the logical tree of switches of the tenant computer network by checking for changes in connectivity from the seed switch; and upon identifying one or more newly discovered switches in the updated logical tree that are not registered with the account, transmitting a notification to the user identifying the one or more newly discovered switches as candidates for claiming, wherein the one or more newly discovered switches are claimed into the account upon receiving input from the user selecting the one or more newly discovered switches for claiming, independent of the user providing identification information for the one or more newly discovered switches.

8. The method of claim 1, wherein claiming the particular set of switches comprises:

transmitting, from the controller to the seed switch, a username and password provided by the user together with a list of the particular set of switches to be claimed;

receiving, at the controller from the seed switch, a device identifier and claim code for each switch in the particular set of switches, wherein the device identifier and claim code for each switch are obtained by the seed switch by contacting each switch in the particular set of switches using the username and password; and registering each switch of the particular set of switches with the account using the device identifier and claim code received from the seed switch, wherein the username and password are not stored by the controller after registration of the particular set of switches is complete.

9. The method of claim 1, further comprising:

in response to determining that one or more switches of the tenant computer network do not support execution of a device connector, deploying a proxy virtual machine on premises within the tenant computer network, wherein the proxy virtual machine executes a device connector on behalf of the one or more switches that do not support execution of a device connector; and receiving, at the controller and from the proxy virtual machine, identification information regarding the one or more switches that do not support execution of a device connector, wherein the proxy virtual machine discovers the one or more switches using a link layer discovery protocol and serves as a proxy for the one or more switches in communicating with the controller.

10. A remote computer network controller comprising:

one or more processors; and one or more non-transitory computer-readable media storing computer-executable instructions that, when executed by the one or more processors, cause the one or more processors to perform operations comprising:

receiving, at a controller and from a user, information regarding a seed switch of a tenant computer network, wherein the controller manages a plurality of tenant computer networks;

claiming the seed switch by registering the switch with an account associated with the user based on the information regarding the seed switch received from the user;

receiving, at the controller and from a device connector of the seed switch, first identification information regarding a first set of switches, the first set of switches being directly connected with the seed switch;

receiving, at the controller and from a device connector of each of the first set of switches, second identification information regarding a second set of switches each of which is directly connected with at least one switch of the first set of switches, wherein the first set of switches and the second set of switches are unregistered to any accounts managed by the controller such that the controller is unaware to which of the plurality of tenant computer networks the first set of switches and the second set of switches belong;

using the first identification information and the second identification information, constructing a logical tree of switches of the tenant computer network;

receiving input from the user indicating a particular set of switches in the logical tree that are to be claimed; and using the first identification information and the second identification information, claiming the particular set of switches of the logical tree of switches such that the particular set of switches are registered with the account independent of the user providing the first identification information and the second identification information.

11. The remote computer network controller as in claim 10, the operations further comprising sending a notification regarding switches to be claimed from the logical tree of switches.

12. The remote computer network controller as in claim 10 the operations further comprising repeatedly receiving identification information regarding directly connected switches until all switches of the tenant computer network have been identified.

13. The remote computer network controller as in claim 10, wherein each of the switches comprises link layer discovery protocol logic.

14. The remote computer network controller as in claim 10 wherein each of the switches comprises Cisco Discover Protocol logic.

15. The remote computer network controller as in claim 10 wherein each of the switches is connected with a wide area network.

16. One or more non-transitory computer-readable media storing computer-executable instructions that, when executed by one or more processors, cause the one or more processors to perform operations comprising:

receiving, at a controller and from a user, information regarding a seed switch of a tenant computer network, wherein the controller manages a plurality of tenant computer networks;

claiming the seed switch by registering the switch with an account associated with the user based on the information regarding the seed switch received from the user;

receiving, at the controller and from a device connector of the seed switch, first identification information regarding a first set of switches, the first set of switches being-directly connected with the seed switch;

receiving, at the controller and from a device connector of each of the first set of switches, second identification information regarding a second set of switches each of which is directly connected with at least one switch of the first set of switches, wherein the first set of switches and the second set of switches are unregistered to any accounts managed by the controller such that the controller is unaware to which of the plurality of tenant computer networks the first set of switches and the second set of switches belong;

using the first identification information and the second identification information, constructing a logical tree of switches of the tenant computer network;

receiving input from the user indicating a particular set of switches in the logical tree that are to be claimed; and using the first identification information and the second identification information, claiming the particular set of switches of the logical tree of switches such that the particular set of switches are registered with the account independent of the user providing the first identification information and the second identification information.

17. The one or more non-transitory computer-readable media of claim 16, the operations further comprising, sending a notification regarding switches to be claimed from the logical tree of switches.

18. The one or more non-transitory computer-readable media of claim 16, the operations further comprising, repeatedly receiving identification information regarding directly connected switches until all switches of the tenant computer network have been identified.

19. The one or more non-transitory computer-readable media of claim 16, wherein each of the switches comprises link layer discovery protocol logic.

20. The one or more non-transitory computer-readable media of claim 16, wherein each of the switches comprises Cisco Discovery Protocol logic.

* * * * *